(12) United States Patent
Gong et al.

(10) Patent No.: US 6,757,656 B1
(45) Date of Patent: Jun. 29, 2004

(54) SYSTEM AND METHOD FOR CONCURRENT PRESENTATION OF MULTIPLE AUDIO INFORMATION SOURCES

(75) Inventors: Qing Gong, West Palm Beach, FL (US); James R. Lewis, Delray Beach, FL (US); Ronald E. Vanbuskirk, Louisville, CO (US); Huifang Wang, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 21 days.

(21) Appl. No.: 09/594,397

(22) Filed: Jun. 15, 2000

(51) Int. Cl.[7] .......................... G10L 21/06; G10L 21/02
(52) U.S. Cl. ..................... 704/275; 704/270.1; 704/270
(58) Field of Search .............................. 704/275, 274, 704/248, 243

(56) References Cited

U.S. PATENT DOCUMENTS

| | | | | |
|---|---|---|---|---|
| 4,401,852 A | * | 8/1983 | Noso et al. ............... | 704/275 |
| 4,506,377 A | * | 3/1985 | Kishi et al. ............... | 704/275 |
| 4,528,687 A | * | 7/1985 | Noso et al. ............... | 704/275 |
| 4,532,648 A | * | 7/1985 | Noso et al. ............... | 704/275 |
| 4,538,295 A | * | 8/1985 | Noso et al. ............... | 704/248 |
| 4,558,459 A | * | 12/1985 | Noso et al. ............... | 704/275 |
| 4,593,403 A | * | 6/1986 | Kishi et al. ............... | 704/275 |
| 4,771,390 A | * | 9/1988 | Dolph et al. ............... | 704/274 |
| 4,827,520 A | * | 5/1989 | Zeinstra .................... | 704/243 |
| 5,450,525 A | * | 9/1995 | Russell et al. ............. | 704/275 |
| 5,621,456 A | * | 4/1997 | Florin et al. .............. | 704/275 |
| 5,950,166 A | * | 9/1999 | Hab-Umbach et al. ..... | 704/275 |
| 6,230,138 B1 | * | 5/2001 | Everhart ................... | 704/275 |
| 6,240,347 B1 | * | 5/2001 | Everhart et al. ........... | 704/275 |

FOREIGN PATENT DOCUMENTS

| | | | | |
|---|---|---|---|---|
| DE | 197 55 863 | * | 12/1997 | ............. G06F/3/16 |
| DE | 199 17 820 | * | 4/1999 | ............. G06F/3/16 |
| EP | DE19755863 | | 6/1999 | ............. G06F/3/16 |
| EP | DE19917820 | | 11/2000 | ............. G06F/3/16 |

* cited by examiner

*Primary Examiner*—Richemond Dorvil
*Assistant Examiner*—Daniel Nolan
(74) *Attorney, Agent, or Firm*—Akerman Senterfitt

(57) ABSTRACT

A method for concurrent presentation of multiple audio information sources. In the method, audio information from at least two audio information sources is concurrently presented, and a user speech selection of one of the audio information sources is accepted. At least one of the audio information sources can then be reconfigured. The reconfiguration audibly distinguishes the user selected audio information source from other audio information sources.

34 Claims, 7 Drawing Sheets

Name A != Name B != Name C

SYSTEM AND METHOD FOR CONCURRENT PRESENTATION OF MULTIPLE AUDIO INFORMATION SOURCES

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of audio interfaces and more particularly to a system and method for concurrent presentation of multiple audio information sources.

2. Description of the Related Art

An Auditory User Interface (AUI) is an interface in which a computer aurally recognizes a user's commands, responds to the commands aurally, and carries out tasks associated with the commands. As with Graphical User Interfaces (GUIs), AUIs work directly with the computational core of a computer application. More specifically, AUIs provide a speech-enabling approach that separates computation from the user interface and integrates speech into the human-computer interaction. AUIs are particularly useful in environments in which a user desires to communicate with a computer aurally because he or she has a limited ability to interact with a computer's visual display.

Conventional AUI systems have been limited in that they typically present only one audio information source to a user at a time. This limitation exists because AUI systems have not had the ability to allow a user to focus on a single audio information source when multiple audio information sources are presented. This drawback is significant because there are numerous situations in which a user may desire to concurrently monitor numerous audio information sources. For example, an automobile driver who is visually focusing on a highway may need to concurrently interact with a satellite-based global navigation system and a cellular telephone. Similarly, a pilot who is flying an airplane may also need to concurrently track the status of several computer systems, along with the locations and distances of other aircraft. In yet another example, visually impaired or blind AUI users may need to quickly isolate an audio information source, such as a radio, prior to interacting with another audio information source, such as a telephone.

The present invention overcomes the deficiencies of the prior art by allowing such users to more easily focus on one or more audio information sources from a plurality of audio information sources. In some cases, the invention can also reduce the reliance on GUIs, allowing all users, including those with visual and other physical impairments, to use and incorporate complex computer functions into their lives.

SUMMARY OF THE INVENTION

The present invention relates to a method for concurrent presentation of multiple audio information sources. In the method, audio information from at least two audio information sources is concurrently presented, and a user speech selection of one of the audio information sources is accepted. At least one of the audio information sources can then be reconfigured. The reconfiguration audibly distinguishes the user selected audio information source from other audio information sources.

A machine readable storage, according to the invention, has stored thereon a computer program having a plurality of code sections executable by a machine for causing the machine to cause the steps of concurrently presenting audio information from at least two audio information sources, accepting a user speech selection of one of the audio information sources, and reconfiguring at least one of the audio information sources so that the reconfiguration audibly distinguishes the user selected audio information source from other audio information sources.

The presenting step can further include presenting one or more audio information source which is audibly distinguishable from that of the other audio information sources. In the presenting step, at least one audio information source can be presented at a volume level which differs from that of the other audio information sources. Alternatively, the presenting step can include having at least one audio information source which originates from a direction that differs from that of the other audio information sources, having at least one audio information source which moves in a direction that differs from that of the other audio information sources, or having at least one audio information source which has at least one sound characteristic which differs from that of the other audio information sources. The presenting step can also include adjusting a sound-related characteristic of at least one audio information source. The sound-related characteristic can be at least one of the group consisting of pitch, echoing, and frequency.

The accepting step can also include accepting a command from the user which identifies at least one of the audio information sources. The command can be a voice command. Moreover, the command from the user can be substantially the same as at least one word generated by the audio information source. The command can also describe the location of the audio information source relative to the user, or be at least one word associated with the name of the audio information source.

In a preferred embodiment, the method can also include a step of accepting a user selection of one or more audio information sources through a user interface, in which the user interface electronically communicates the user selection to one or more audio information sources. In this embodiment, the user interface can be a keypad.

The presenting step can further include, prior to the accepting step, the step of temporarily reconfiguring at least one audio information source, whereby the user can consider whether to select the temporarily reconfigured audio information source. Prior to the accepting step, the method can also include the step of having at least one audio information source identify itself by generating sound which describes the audio information source. The reconfiguring step can include adjusting the volume of at least one selected or non-selected audio information source.

BRIEF DESCRIPTION OF THE DRAWINGS

There are presently shown in the drawings embodiments which are presently preferred, it being understood, however, that the invention is not limited to the precise arrangements and instrumentalities shown.

DETAILED DESCRIPTION OF THE INVENTION

Figure 1:
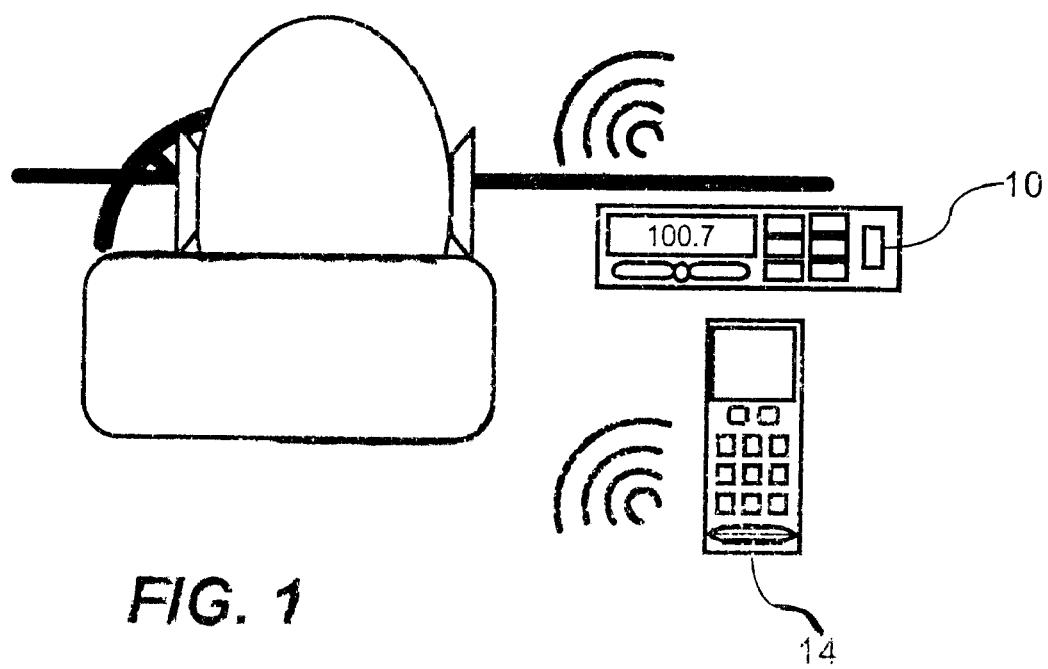
FIG. 1 is a pictorial representation of a user presented with audio information from multiple audio information sources.

The present invention relates to a method and system for concurrent presentation of multiple audio information sources. FIG. 1 depicts a user being presented with audio information from multiple audio information, sources. As shown in FIG. 1, the multiple audio information sources may be a radio 10 and a cellular telephone 14. It is understood, however, that the invention is not limited to any particular type or number of audio information sources.

Figure 2:
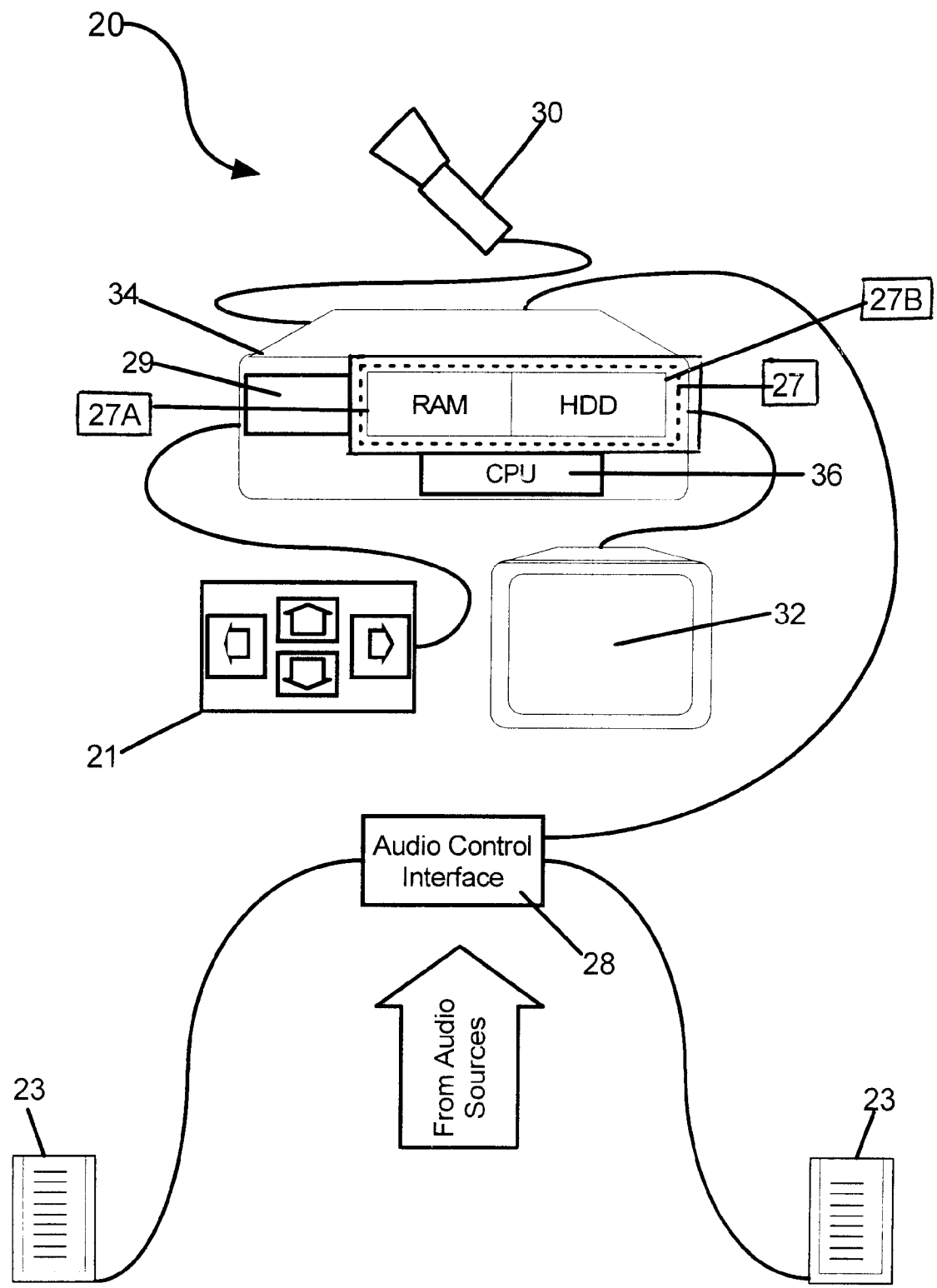
FIG. 2 is a block diagram of a computer system suitable for use with the present invention.

FIG. 2 shows a typical computer system 20 suitable for use in conjunction with the present invention. The system is preferably comprised of a computer 34 including a central processing unit (CPU) 36, one or more memory devices 27, which can include an electronic random access memory 27A and a bulk data storage unit 27B such as a magnetic disc drive, and associated circuitry. The computer system 20 also includes a microphone 30 operatively connected to the computer system 20 through suitable interface circuitry or a "sound board" (not shown), and an audio control interface 28. The computer system 20 can also have at least one user interface display 32, such as a video data terminal (VDT) operatively connected thereto. The user interface display 32 can be configured so that a user can provide instructions to the computer system by touching a screen, or other suitable structure, on the user interface display 32.

The CPU 36 can be comprised of any suitable microprocessor or other electronic processing unit, as is well known to those skilled in the art. For example, the CPU 36 can be a PENTIUM or PENTIUM II brand microprocessor available from Intel Corporation, although the invention is not limited in this regard. Speakers 23, as well as an interface device 21 such as a keypad, can also be provided with the computer system 20, but are not necessary for operation of the invention as described herein. The various hardware requirements for the computer system 20 as described herein can generally be satisfied by any one of many commercially available high speed embedded computer systems.

Figure 3:
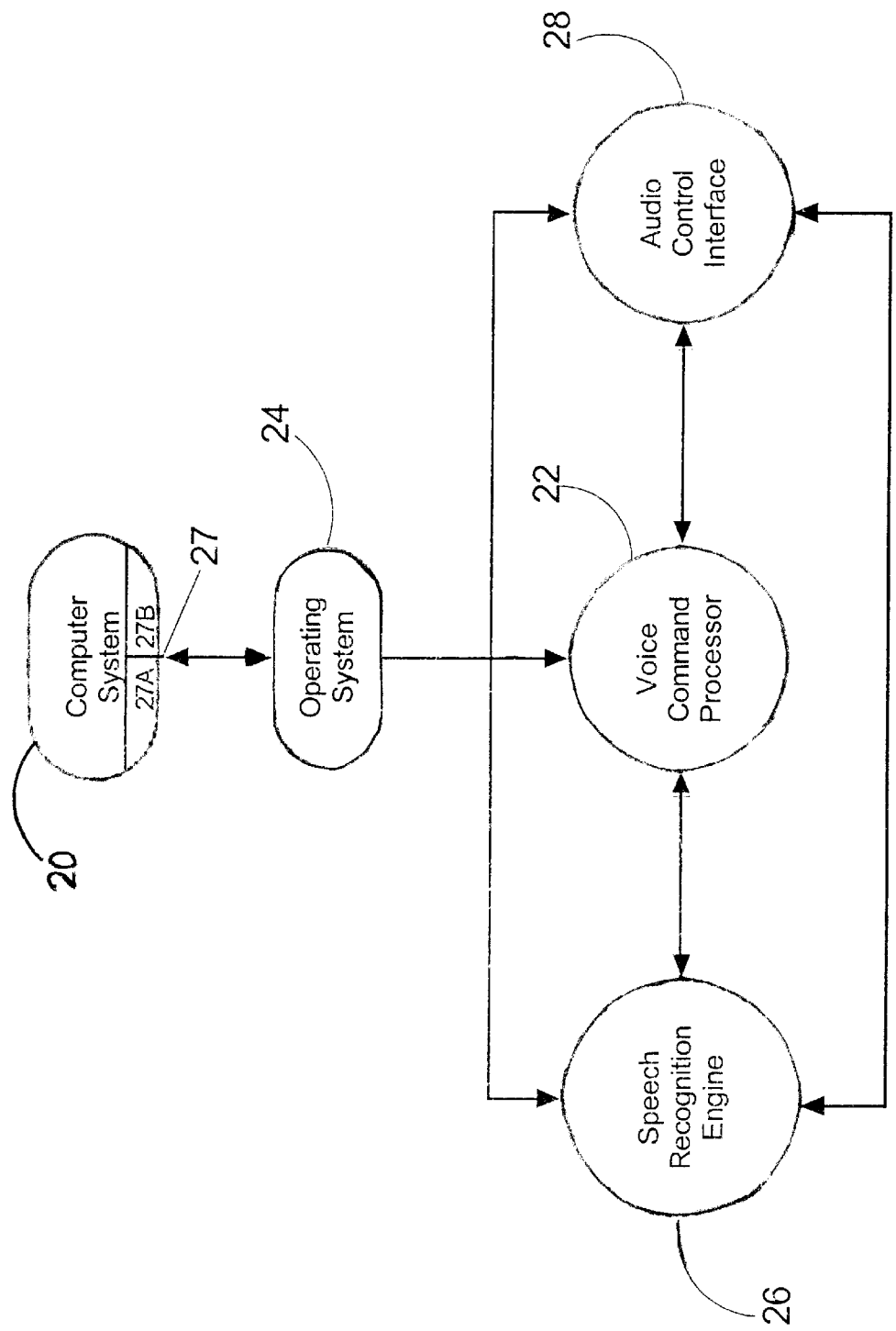
FIG. 3 is a schematic representation of a computer architecture for use in the computer system of FIG. 2 suitable for use with the present invention.

FIG. 3 illustrates a preferred architecture for a speech recognition system which can be used in conjunction with the computer system 20. The computer system 20 can include computer memory devices 27, which can be composed of electronic random access memory 27A and one or more bulk data storage mediums 27B, such as a magnetic disk drive. The computer system 20 can also include an operating system 24 and a speech recognition engine application 26. In the example shown, a voice command processor 22 and an audio control interface 28 are also provided. However, the invention is not limited in this regard, as the speech recognition engine application 26 can be used with any other application program which can be voice enabled. In FIG. 3, speech recognition engine 26, voice command processor 22, and audio control interface 28 are shown as separate application programs. It should be noted, however, that the invention is not limited in this regard, and that these various application programs could be implemented as more complex applications program. For example, the speech recognition engine 26 could be combined with the voice command processor 22 or with any other application to be used in conjunction with the speech recognition engine 26. The primary purpose of the audio control interface 28 is to help coordinate the operation of the speech recognition engine 26.

In a preferred embodiment, which shall be discussed herein, the operating system 24 is an embedded operating system, such as QNX Neutrino® or Wind River System's VxWorks®. The operating system 24 is not limited in this regard, however, as the invention can also be used with any other type of computer operating system, such as WindowsCE® or WindowsNT®, each of which is available from Microsoft Corporation of Redmond, Wash. The method of the present invention can be implemented by a computer programmer to execute in the operating system 24 using commercially available development tools for the operating system 24 described above. In operation, audio signals representative of sound received in the microphone 30 are processed within the computer system 20 using conventional computer audio circuitry 29 so as to be made available to the operating system 24 in digitized form. The audio signals received by the audio circuitry 29 in the computer system 20 are conventionally provided to the speech recognition engine application 26 via the operating system 24 in order to perform speech recognition functions. As in conventional speech recognition systems, the audio signals are processed by the speech recognition engine 26 to identify words spoken by a user into the microphone 30.

The present invention can be realized in hardware, software, or a combination of hardware and software. Machine readable storage according to the present invention can be realized in a centralized fashion in one computer system, or in a distributed fashion where different elements are spread across several interconnected computer systems. Any kind of computer system or other apparatus adapted for carrying out the methods described herein is acceptable. A typical combination of hardware and software could be a general purpose computer system with a computer program that, when being loaded and executed, controls the computer system such that it carries out the methods described herein. The present invention can also be embedded in a computer program product which comprises all the features enabling the implementation of the methods described herein, and which when loaded in a computer system is able to carry out these methods.

A computer program in the present context can mean any expression, in any language, code or notation, of a set of instructions intended to cause a system having an information processing capability to perform a particular function either directly or after either or both of the following: (a) conversion to another language, code or notation; and (b) reproduction in a different material form. The invention disclosed herein can be a method embedded in a computer program which can be implemented by a programmer using commercially available development tools for the operating system 24 described above.

The invention can be more fully understood by recognizing that individuals typically cannot process multiple streams of audio information concurrently, but usually can monitor several different streams of audio information at the same time and elect to focus on one or more particular streams of audio information. For example, in an office environment, one can recognize and distinguish the sounds of a conversation between colleagues from someone talking on the telephone and a speech recognition system voice generated by a computer. A method or system in accordance with the inventive arrangement allows a user to focus on one or more streams of audio information being generated by a plurality of audio information sources.

According to the invention, a user can be concurrently presented with audio information from a plurality of audio information sources. Any suitable audio information source can be used in conjunction with the invention. For example, an audio information source can be a telephone, a radio, or the computer system 20 having a voice command processor 22. At least one audio information source has a configuration that differs from the configuration of the other audio information sources, so that a user can distinguish audio information from the one audio information source from that of the other audio information sources.

There are numerous ways to configure audio information sources so that they can concurrently present audio information to a user in a manner in which the user can distinguish the different streams of audio information. For example, a plurality of audio information sources can be configured to present audio information at a plurality of volume levels. Alternatively, the audio information can vary based upon the location from which the audio information appears to originate, such as to the left, right, front, or back of a speaker. Similarly, audio information can vary based upon the direction in which it appears to be moving, such as from left to right, right to left, front to back, or back to front. Audio information sources can also present audio information with varying sound characteristics, so that a plurality of audio information sources vary, for example, in pitch, degree of echoing, or voice gender. It is understood that the above examples can be used in combination with each other, and that other methods and/or combinations of configuring audio information sources are also acceptable.

When audio information from multiple audio information sources is concurrently presented, a user can select one or more of the audio information sources. There are numerous ways in which the user may select an audio information source. For example, the user can select an audio information source by uttering one or more words which were recently generated by an audio information source. Alternatively, the user can choose an audio information source by saying a command which describes the audio information source, such as "one coming from my left side."

If audio information sources are presenting audio information from multiple locations, users can use an interface device 21, such as a keypad having arrow keys, to select one or more audio information sources. In this scenario, the user can press an arrow key which points in the direction of the audio information in which the user is interested in focusing.

In yet another example, one or more audio information sources can be associated with a name, such as the name of the piece of equipment from which the sound is originating (i.e. telephone or a voice from a speech recognition application), or a person's name. In this case, the user can focus on a stream of audio information being generated by an audio information source by uttering the name associated with that audio information source.

While the user is being presented with multiple streams of audio information, it may be difficult for the user to distinguish one audio information stream from another. To help the user distinguish streams of audio information, and the audio information sources from which they originate, one or more streams of audio information can be temporarily brought to the foreground in any suitable manner. One manner in which a stream of audio information can be brought to the foreground is by temporarily increasing its volume relative to the other streams of audio information. Similarly, several streams of audio information may be temporarily and sequentially brought into the foreground, so that the user can focus on a series of streams of audio information, one at a time. It is understood that other methods of bringing one or more streams of audio information to the foreground are also appropriate.

Selected audio information sources can be reconfigured. This reconfiguration distinguishes the user selected audio information source or sources from the other audio information sources. This reconfiguration can occur in any suitable manner, such as by adjusting a sound-characteristic of one or more streams of audio information. Alternatively, the volume of the audio information generated by a selected sound source can be increased, or the volume of the audio information from the non-selected sound sources can be decreased. This decrease in volume can be a complete or partial muting of the audio information from the non-selected sound sources. The user can subsequently return the audio information associated with the non-selected sound sources to its original volume level via a voice command or manual action (for example, by pressing a keypad).

FIGS. 4A–4D illustrate preferred embodiments of the invention, in which multiple audio information sources are presented to a user. In each of FIGS. 4A–4D, a user is concurrently presented with audio information from three distinct audio information sources, designated as sound sources A, B, and C. Each sound source can present audio information at the same or different volume levels. Sound source A is located to the left of the user, sound source B is located in front of the user, and sound source C is located to the right of the user.

Figure 4A:
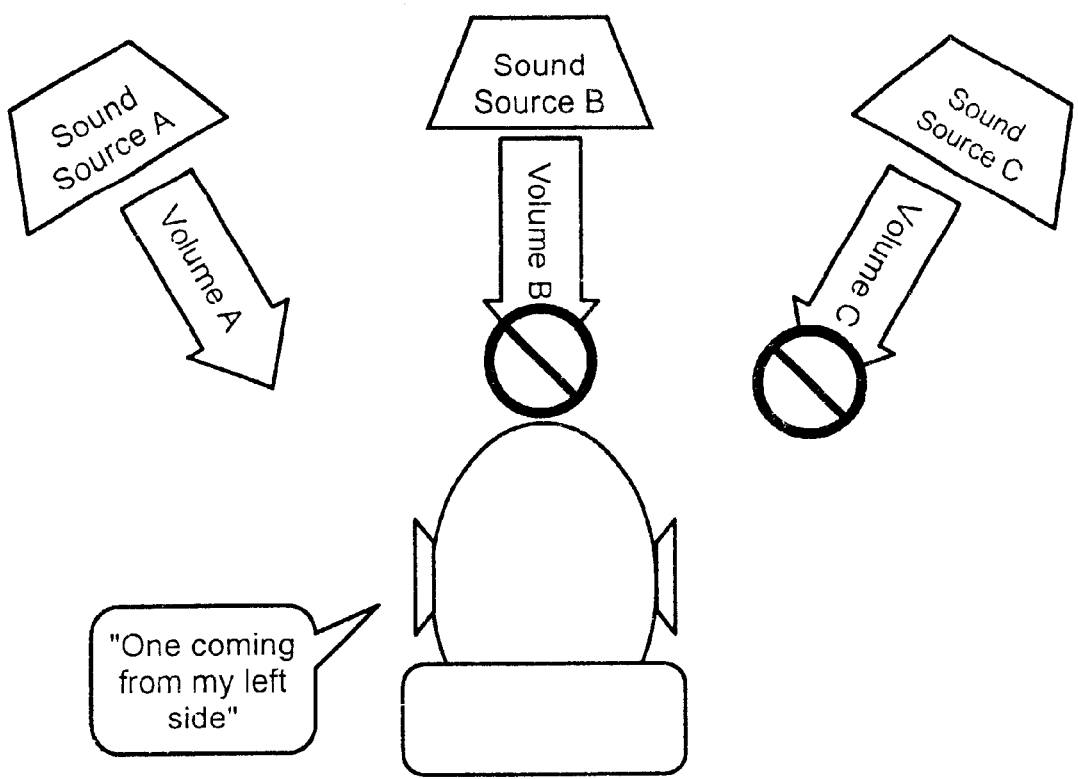
FIGS. 4A–4D, taken together, are pictorial representations of a method and system for concurrent presentation of multiple audio information sources.

In FIG. 4A, the user is presented with audio information being generated by sound sources A, B, and C. The volume of the audio information generated by sound source A varies from the volume of the audio information generated by the other sound sources B and C. In FIG. 4A, the user is interested in focusing on the audio information generated by sound source A, and states "one coming from my left side." As a result, either the volume of selected sound source A is reconfigured so that it is louder than that of sound sources B and C, or the volume of non-selected sound sources B and C is reconfigured so that it is quieter than that of sound source A. For instance, in a preferred case, the audio information emanating from sound sources B and C can be muted so as to isolate the audio information emanating from sound source A. Consequently, the user is able to focus on the audio information being generated by sound source A. This arrangement may be useful in many situations. For example, an automobile driver who is visually focusing on the highway may want to lower the volume of the automobile's radio (sound source B) and the computer generated voice associated with the automobile's navigation system (sound source C) while he or she speaks on a mobile telephone (sound source A). In another example, a user of a speech recognition system may want to raise the volume of the dialog taking place between the user and the system (sound source A), while placing a voice which repeats a list of computer commands available to the user in the background (sound source B or C).

Figure 4B:
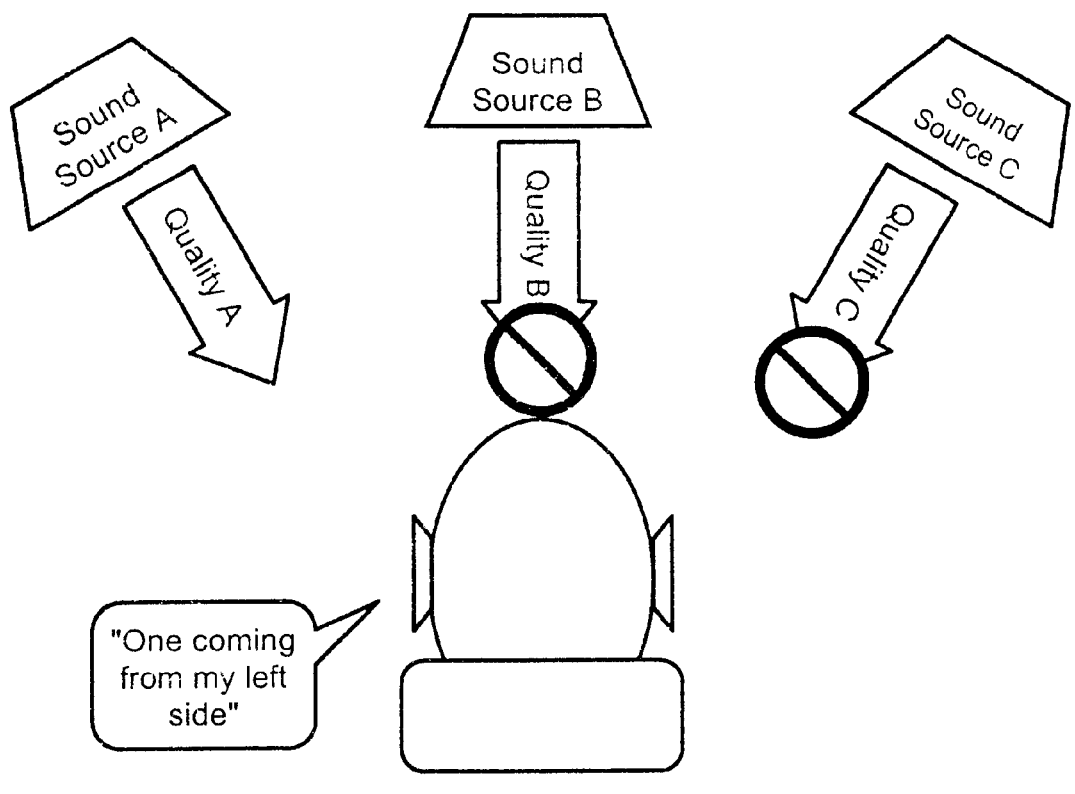

In FIG. 4B, the user is presented with audio information being generated by sound sources A, B, and C. In contrast with FIG. 4A, in which the volume of the audio information presented by sound source A varies from that of the volume of the audio information presented by sound sources B and C, in the arrangement of FIG. 4B, the quality of the audio information presented by sound source A varies from that of the audio information presented by the other sound sources B and C. The quality can be any of a number of sound-related characteristics, such as pitch or a voice of a particular gender. In FIG. 4B, the user is interested in focusing on the audio information generated by source A. When the user states "one coming from my left side," the quality of the audio information generated by sound source A is reconfigured, or the quality of audio information generated by sound sources B and C are reconfigured. As a result of this reconfiguration, the user can focus on the audio information presented by sound source A.

Figure 4C:
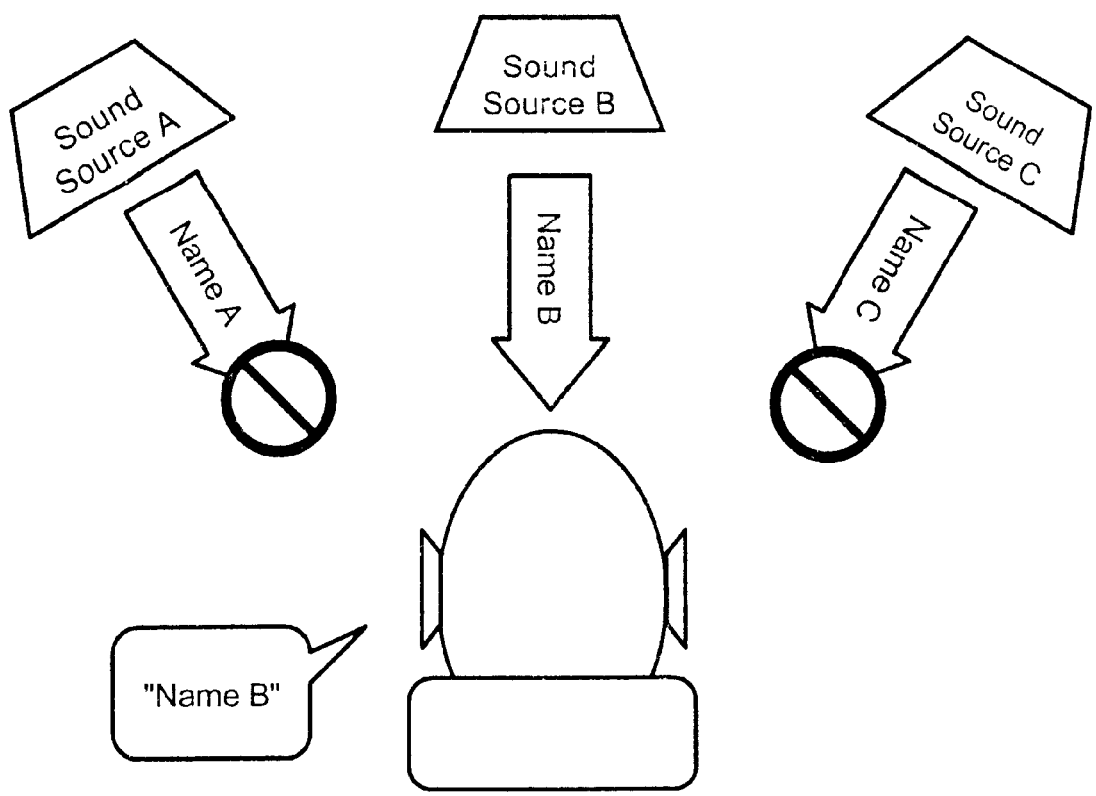

In FIG. 4C, the user is interested in focusing on the audio information generated by sound source B. A voice command from the user selects sound source B by stating the name associated with sound source B. The associated name can be the name of any suitable object, such as a telephone, a television set, or a radio. In the alternative, the associated name can also be the name of the individual whose voice is being generated by sound source B. The voice command of the user also indicates that sound source B is to be reconfigured by increasing its volume.

Figure 4D:
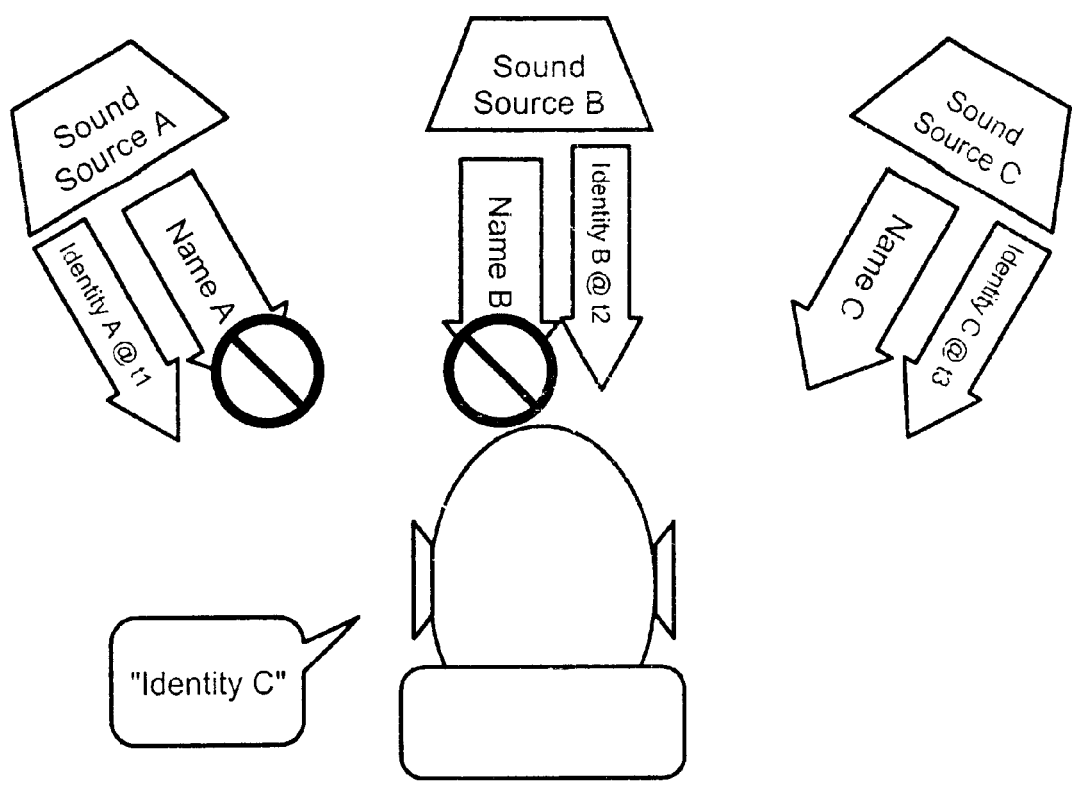

In FIG. 4D, audio information sources A, B, and C are each presenting audio information to the user. Each audio information source A, B, and C is capable of identifying itself by stating one or more descriptive words, such as "telephone," "computer," or "radio." This identification can occur concurrently with the presentation of audio information. For example, the audio information can identify itself intermittently, at predetermined time intervals, such as every thirty seconds. In FIG. 4D, the user is interested in the audio information generated by sound source C. In response to the user's identifying sound source C, the audio information generated by sound source C is reconfigured, or the audio information generated by sound sources A and B are reconfigured. As a result of this reconfiguration, the user can focus on the audio information presented by sound source C.

It should be understood that the examples and embodiments described herein are for illustrative purposes only and that various modifications or changes in light thereof will be obvious to persons skilled in the art, and that such modifications or changes are to be included within the spirit and purview of this application. Moreover, the invention can take other specific forms without departing from the spirit or essential attributes thereof.

What is claimed is:

1. A method for concurrent presentation of multiple audio information sources, comprising the steps of:
concurrently presenting audio information from at least two audio information sources;
accepting a user speech selection of at least one of the audio information sources; and
responsive to said accepting step, automatically reconfiguring at least one of the audio information sources, whereby the reconfiguration audibly distinguishes the at least one user selected audio information source from others of the audio information sources.

2. The method according to claim 1, wherein said presenting step further comprises presenting at least one audio information source which is audibly distinguishable from each other audio information source.

3. The method according to claim 1, wherein said presenting step further comprises having at least one audio information source at a volume level which differs from that of the other audio information sources.

4. The method according to claim 1, wherein said accepting step further comprises accepting a command from the user which specifies a name of at least one audio information source.

5. The method according to claim 4, further comprising the step of accepting a user selection of at least one of the audio information sources through a user interface, wherein the user interface electronically communicates the user selection to at least one audio information source.

6. The method according to claim 5, wherein the user interface is a keypad.

7. The method according to claim 4, wherein the command is at least one word associated with the name of the at least one audio information source.

8. The method according to claim 1, wherein said reconfiguring step further comprises adjusting the volume of at least one selected audio information source.

9. The method according to claim 1, wherein said presenting step further comprises adjusting a sound-related characteristic of at least one audio information source.

10. The method according to claim 9, wherein the sound-related characteristic is at least one selected from the group consisting of pitch, echoing, and frequency.

11. A method for concurrent presentation of multiple audio information sources, comprising the steps of:
concurrently presenting audio information from at least two audio information sources, wherein said presenting step further comprises having at least one audio information source which originates from a direction that differs from that of the direction from which the other audio information sources originate;
accepting a user speech selection of at least one of the audio information sources; and
reconfiguring at least one of the audio information sources, whereby the reconfiguration audibly distinguishes the at least one user selected audio information source from others of the audio information sources.

12. A method for concurrent presentation of multiple audio information sources, comprising the steps of:
concurrently presenting audio information from at least two audio information sources, wherein said presenting step further comprises having at least one audio information source which moves in a direction that differs from that of the direction in which the other audio information sources move;
accepting a user speech selection of at least one of the audio information sources; and
reconfiguring at least one of the audio information sources, whereby the reconfiguration audibly distinguishes the at least one user selected audio information source from others of the audio information sources.

13. A method for concurrent presentation of multiple audio information sources, comprising the steps of:
concurrently presenting audio information from at least two audio information sources;
accepting a user speech selection of at least one of the audio information sources, wherein said accepting step further comprises accepting a command from the user which identifies at least one audio information source, wherein the command from the user is the same as at least one word generated by the audio information source; and
reconfiguring at least one of the audio information sources, whereby the reconfiguration audibly distinguishes the at least one user selected audio information source from others of the audio information sources.

14. A method for concurrent presentation of multiple audio information sources, comprising the steps of:
concurrently presenting audio information from at least two audio information sources;

accepting a user speech selection of at least one of the audio information sources, wherein said accepting step further comprises accepting a command from the user which identifies at least one audio information source, wherein the command describes the location of the audio information source relative to the user; and reconfiguring at least one of the audio information sources, whereby the reconfiguration audibly distinguishes the at least one user selected audio information source from others of the audio information sources.

15. A method for concurrent presentation of multiple audio information sources, comprising the steps of:

concurrently presenting audio information from at least two audio information sources, wherein said presenting step further comprises the step of temporarily reconfiguring at least one audio information source, whereby the user can consider whether to select the temporarily reconfigured audio information source;

accepting a user speech selection of at least one of the audio information sources; and reconfiguring at least one of the audio information sources, whereby the reconfiguration audibly distinguishes the at least one user selected audio information source from others of the audio information sources.

16. A method for concurrent presentation of multiple audio information sources, comprising the steps of:

concurrently presenting audio information from at least two audio information sources, wherein at least one audio information source identifies itself by generating sound which describes the audio information source;

accepting a user speech selection of at least one of the audio information sources; and reconfiguring at least one of the audio information sources, whereby the reconfiguration audibly distinguishes the at least one user selected audio information source from others of the audio information sources.

17. A method for concurrent presentation of multiple audio information sources, comprising the steps of:

concurrently presenting audio information from at least two audio information sources;

accepting a user speech selection of at least one of the audio information sources; and reconfiguring at least one of the audio information sources, wherein said reconfiguring step further comprises adjusting the volume of at least one non-selected audio information source, whereby the reconfiguration audibly distinguishes the at least one user selected audio information source from others of the audio information sources.

18. A machine readable storage, having stored thereon a computer program having a plurality of code sections executable by a machine for causing the machine to cause the steps of:

concurrently presenting audio information from at least two audio information sources;

accepting a user speech selection of at least one of the audio information sources; and responsive to said accepting step, automatically reconfiguring at least one of the audio information sources, whereby the reconfiguration audibly distinguishes the at least one user selected audio information source from others of the audio information sources.

19. The machine readable storage according to claim 18, wherein said presenting step further comprises presenting at least one audio information source which is audibly distinguishable from each other audio information source.

20. The machine readable storage according to claim 18, wherein said presenting step further comprises having at least one audio information source at a volume level which differs from that of the other audio information sources.

21. The machine readable storage according to claim 18, wherein said accepting step further comprises accepting a command from the user which specifies a name of at least one audio information source.

22. The machine readable storage according to claim 21, further comprising the step of accepting a user selection of at least one of the audio information sources through a user interface, wherein the user interface electronically communicates the user selection to at least one audio information source.

23. The machine readable storage according to claim 22, wherein the user interface is a keypad.

24. The machine readable storage according to claim 21, wherein the command is at least one word associated with name of the at least one audio information source.

25. The machine readable storage according to claim 18, wherein said reconfiguring step further comprises adjusting the volume of at least one selected audio information source.

26. The machine readable storage according to claim 18, wherein said presenting step further comprises adjusting a sound-related characteristic of at least one audio information source.

27. The machine readable storage according to claim 26, wherein the sound-related characteristic is at least one selected from the group consisting of pitch, echoing, and frequency.

28. A machine readable storage, having stored thereon a computer program having a plurality of code sections executable by a machine for causing the machine to cause the steps of:

concurrently presenting audio information from at least two audio information sources, wherein said presenting step further comprises having at least one audio information source which originates from a direction that differs from the direction from which the other audio information sources originate;

accepting a user speech selection of at least one of the audio information sources; and reconfiguring at least one of the audio information sources, whereby the reconfiguration audibly distinguishes the at least one user selected audio information source from others of the audio information sources.

29. A machine readable storage, having stored thereon a computer program having a plurality of code sections executable by a machine for causing the machine to cause the steps of:

concurrently presenting audio information from at least two audio information sources, wherein said presenting step further comprises having at least one audio information source which moves in a direction that differs from that of the direction in which the other audio information sources move;

accepting a user speech selection of at least one of the audio information sources; and reconfiguring at least one of the audio information sources, whereby the reconfiguration audibly distinguishes the at least one user selected audio information source from others of the audio information sources.

30. A machine readable storage, having stored thereon a computer program having a plurality of code sections executable by a machine for causing the machine to cause the steps of:

concurrently presenting audio information from at least two audio information sources;

accepting a user speech selection of at least one of the audio information sources, wherein said accepting step further comprises accepting a command from the user which identifies at least one audio information source, wherein the command is the same as at least one word generated by the audio information source; and reconfiguring at least one of the audio information sources, whereby the reconfiguration audibly distinguishes the at least one user selected audio information source from others of the audio information sources.

31. A machine readable storage, having stored thereon a computer program having a plurality of code sections executable by a machine for causing the machine to cause the steps of:

concurrently presenting audio information from at least two audio information sources;

accepting a user speech selection of at least one of the audio information sources, wherein said accepting step further comprises accepting a command from the user which identifies at least one audio information source, wherein the command describes the location of the audio information source relative to the user; and reconfiguring at least one of the audio information sources, whereby the reconfiguration audibly distinguishes the at least one user selected audio information source from others of the audio information sources.

32. A machine readable storage, having stored thereon a computer program having a plurality of code sections executable by a machine for causing the machine to cause the steps of:

concurrently presenting audio information from at least two audio information sources, said presenting step further comprises the step of temporarily reconfiguring at least one audio information source, whereby the user can consider whether to select the temporarily reconfigured audio information source;

accepting a user speech selection of at least one of the audio information sources; and reconfiguring at least one of the audio information sources, whereby the reconfiguration audibly distinguishes the at least one user selected audio information source from others of the audio information sources.

33. A machine readable storage, having stored thereon a computer program having a plurality of code sections executable by a machine for causing the machine to cause the steps of:

concurrently presenting audio information from at least two audio information sources, said method further comprises the step of having at least one audio information source identify itself by generating sound which describes the audio information source;

accepting a user speech selection of at least one of the audio information sources; and reconfiguring at least one of the audio information sources, whereby the reconfiguration audibly distinguishes the at least one user selected audio information source from others of the audio information sources.

34. A machine readable storage, having stored thereon a computer program having a plurality of code sections executable by a machine for causing the machine to cause the steps of:

concurrently presenting audio information from at least two audio information sources;

accepting a user speech selection of at least one of the audio information sources; and reconfiguring at least one of the audio information sources, wherein said reconfiguring step further comprises adjusting the volume of at least one non-selected audio information source, whereby the reconfiguration audibly distinguishes the at least one user selected audio information source from others of the audio information sources.

* * * * *